United States Patent
Ghisa et al.

(10) Patent No.: US 9,224,085 B2
(45) Date of Patent: Dec. 29, 2015

(54) ELECTRONIC PASSPORT

(75) Inventors: Giuseppe Ghisa, Rome (IT); Laura Luciani, Rome (IT)

(73) Assignee: ISTITUTO POLIGRAFICO E ZECCA DELLO STATO S.P.A., Rome (IT)

( * ) Notice: Subject to any disclaimer, the term of this patent is extended or adjusted under 35 U.S.C. 154(b) by 188 days.

(21) Appl. No.: 13/825,307

(22) PCT Filed: Sep. 26, 2011

(86) PCT No.: PCT/IB2011/054220
§ 371 (c)(1),
(2), (4) Date: May 17, 2013

(87) PCT Pub. No.: WO2012/038940
PCT Pub. Date: Mar. 29, 2012

(65) Prior Publication Data
US 2013/0233928 A1    Sep. 12, 2013

(30) Foreign Application Priority Data

Sep. 24, 2010   (EP) .................................... 10425312

(51) Int. Cl.
*B42D 15/00* (2006.01)
*G06K 19/077* (2006.01)
(Continued)

(52) U.S. Cl.
CPC .......... *G06K 19/07722* (2013.01); *B42D 1/003* (2013.01); *B42D 1/06* (2013.01); *B42D 25/00* (2014.10); *B42D 25/328* (2014.10); *G06K 19/025* (2013.01); *G06K 19/0779* (2013.01); *B42C 19/04* (2013.01); *B42D 1/001* (2013.01); *B42D 1/02* (2013.01); *B42D 13/00* (2013.01);

(Continued)

(58) Field of Classification Search
USPC .................................... 235/488; 283/63.1, 38
See application file for complete search history.

(56) References Cited

U.S. PATENT DOCUMENTS 5,203,590 A *    4/1993  Ranson ......................... 281/21.1
2005/0128085 A1*  6/2005  Bon ............................ 340/572.7
(Continued)

FOREIGN PATENT DOCUMENTS

DE    102005020198 A1    11/2006
DE    102006011388 A1     9/2007
(Continued)

OTHER PUBLICATIONS

"Machine Readable Travel Documents" Sixth Edition—2006 Doc 9303, Part 1, Machine Readable Passports, published by the International Civil Aviation Organization.*
(Continued)

*Primary Examiner* — Daniel Hess
(74) *Attorney, Agent, or Firm* — Steinfl & Bruno LLP

(57) ABSTRACT

An electronic passport in the form of a booklet, bearing a plurality of sheets sewn there among at the respective longitudinal center lines is described. The electronic passport has a cover sheet and a data sheet. The cover sheet has a layer made of fabric, an electronic inlay and an internal flyleaf layer and embedding an electronic data storage means provided with an antenna for radio transmission. The data sheet is made by a first and a second layer of plastic material. The data sheet defines a data page bearing identification data of a subject and a connecting page made fixed with the cover sheet, and also comprises an intermediate layer of flexible material extending at the center line of sewing.

18 Claims, 2 Drawing Sheets

(51) Int. Cl.
   *B42D 1/06*      (2006.01)
   *G06K 19/02*     (2006.01)
   *B42D 25/328*    (2014.01)
   *B42D 25/00*     (2014.01)
   *B42C 19/04*     (2006.01)
   *B42D 1/00*      (2006.01)
   *B42D 1/02*      (2006.01)
   *B42D 13/00*     (2006.01)
   *B42D 25/455*    (2014.01)
   *B42D 25/46*     (2014.01)
   *B42D 25/24*     (2014.01)

(52) U.S. Cl.
   CPC ............... *B42D 25/24* (2014.10); *B42D 25/455* (2014.10); *B42D 25/46* (2014.10); *B42D 2033/30* (2013.01); *B42D 2033/40* (2013.01); *B42D 2033/46* (2013.01); *Y10T 156/10* (2015.01); *Y10T 156/1052* (2015.01)

(56) References Cited

U.S. PATENT DOCUMENTS

2008/0284155 A1    11/2008   Christen et al.
2009/0219136 A1*    9/2009   Brunet et al. ............... 340/5.86

FOREIGN PATENT DOCUMENTS

EP    1380442 A1    2/2004
EP    1574359 A2    9/2005
EP    1731328 A2    12/2006

OTHER PUBLICATIONS

PCT International Search Report mailed on May 16, 2012 for PCT/IB2011/054220 filed on Sep. 26, 2011 in the name of Istituto Poligrafico E Zecca Dello Stato S.P.A.

PCT Written Opinion mailed on May 16, 2012 for PCT/IB2011/054220 filed on Sep. 26, 2011 in the name of Istituto Poligrafico E Zecca Dello Stato S.P.A.

* cited by examiner

ELECTRONIC PASSPORT

CROSS REFERENCE TO RELATED APPLICATIONS

The present application is the U.S. national stage of International Application PCT/IB2011/054220filed on Sep. 26, 2011which, in turn, claims priority to European Patent Application EP 10425312.5 filed on Sep. 24, 2010.

TECHNICAL FIELD OF THE INVENTION

The present invention relates to an identification (ID) document, in particular a so-called electronic passport of the type having a page made of plastic material, e.g. polycarbonate, bearing the ID data of a subject.

BACKGROUND

Various types of so-called "electronic" identification documents—in particular, passports—are known, i.e. documents embedding a chip in the form of an RFID device. In such documents the chip is housed at a polycarbonate (PC) page. The latter bears ID data of the subject, also in a different and immediately readable form obtained e.g. by printing or the so-called "laser engraving", and can anyhow be provided with encrypted elements or authentication means such as holograms and the like.

In many of the known documents, the above-mentioned polycarbonate page is connected to the remainder of the document, which is typically in the form of a booklet, by its own extension, always made of polycarbonate, having a reduced protruding region and that is sewn, at the centre line of the booklet itself, to the cover and/or the remaining pages. EP 1 380 442 and EP 1 731 328 describe documents of the hereto-mentioned type. A significant drawback of the documents described hereto is the high rigidity of the data page, making it subject to a breakage by fissuring or cracking when stressed by repeated and/or marked torsions and bendings, especially considering that said page is however inserted between further pages that are extremely more flexible.

The above rigidity also makes rather critical the connection modes for connecting the data page to the remaining parts of the booklet.

US 2008/0284155 describes instead a passport in the form of a booklet bearing a data page, the latter manufactured by two polycarbonate layers between which a flexible layer is partially interposed. The flexible layer develops past the two polycarbonate layers, forming an extension at which the data page is sewn into the booklet.

However, in this case the connection of the data page to the remainder of the document can be not very resistant.

Moreover, known identification documents can generally be optimised with regard to the possibility of a counterfeiting thereof.

SUMMARY OF THE INVENTION

Therefore, the technical problem posed and solved by the present invention is that of providing an identification document, and in particular a passport, allowing overcoming the drawbacks mentioned above with reference to the known art.

Such a problem is solved by an identification document according to claim 1. The invention relates as well to a method of manufacturing said identification document according to claim 17 or 18.

Preferred features of the present invention are provided in the dependent claims.

The present invention provides some relevant advantages. One of the main advantages consists in a flexible layer positioned at the seam region of the plastic material data sheet thus allowing an optimal connection of the latter to the remainder of the document, drastically improving the overall mechanical properties of the document concerning its resistance to fracture and breakage in general. Moreover, the extension of the data sheet is glued onto the cover flyleaf, besides being sewn together to the other pages, with the advantage of enhancing the firmness of connection with the booklet.

In this respect, the data page made of homogeneous plastic material is specifically conceived to be bound inside the document in the form of a booklet, remaining anyhow customisable for instance by laser engraving, and capable of bearing plural security/anti-counterfeiting elements such as to make it irreproducible.

Moreover, the arrangement of the RFID chip on the document cover in a separate, uncoupled position from the data page ensures a higher security standard with respect to known-art documents containing the chip inside the same polycarbonate (PC) data page. In fact, a check of the matching of data recorded on the polycarbonate (PC) data page with the data stored in the RFID chip inserted in the cover guarantees the authenticity of the two main elements of the booklet and any tampering could take place only by replacing both elements.

Moreover, the method according to the invention allows a quick, simple and reliable manufacturing of the identification document.

Other advantages, features and the operation steps of the present invention will be made apparent in the following detailed description of some embodiments thereof, given by way of example and not for limitative purposes.

BRIEF DESCRIPTION OF THE FIGURES

Reference will be made to the figures of the annexed drawings, wherein.

DETAILED DESCRIPTION OF PREFERRED EMBODIMENTS

Figure 1A:
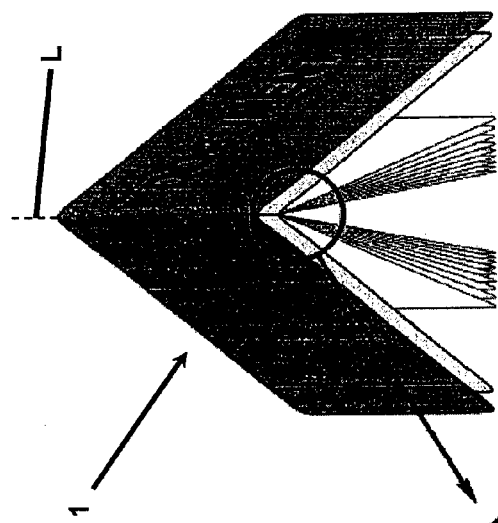
FIGS. 1A and 1B refer to a preferred embodiment of the identification document of the present invention, showing a schematic view thereof respectively in a side perspective and in an enlarged side view (the latter with magnified thicknesses, and for greater clarity not necessarily depicted in proportion), and highlighting its structure in the form of a booklet.
Figure 1B:
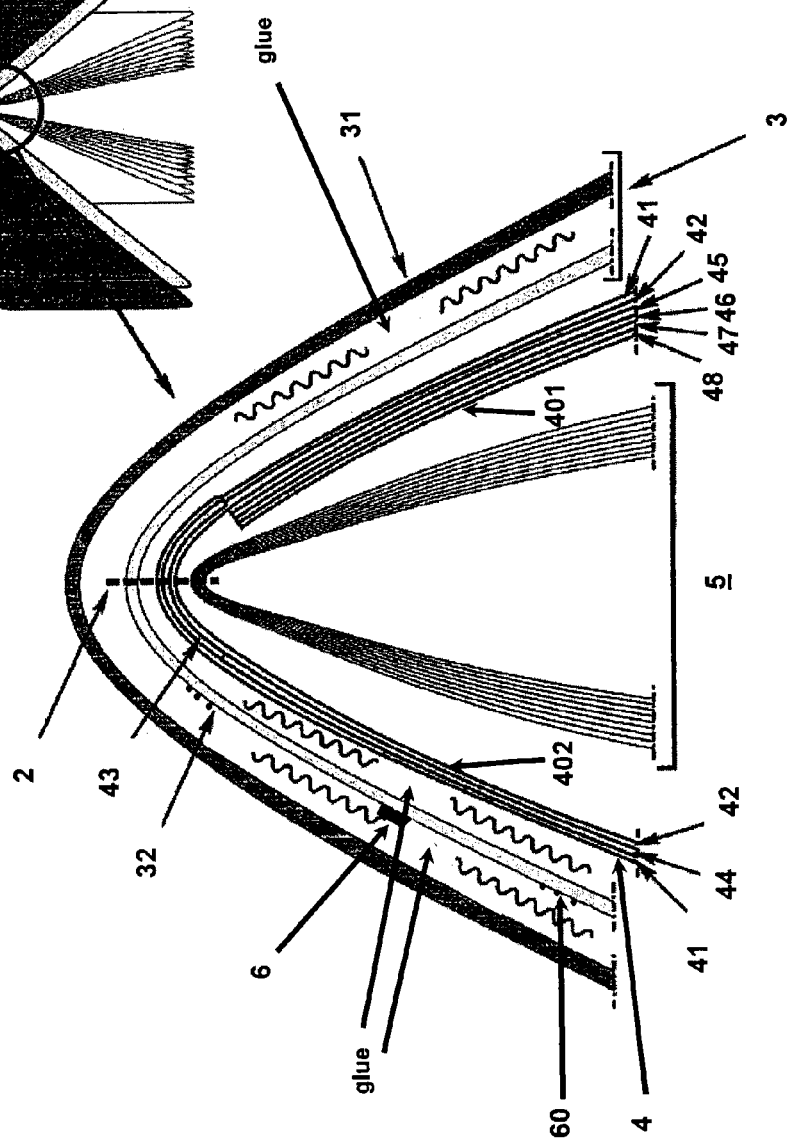

Referring initially to FIG. 1, an identification document in the form of a booklet according to a preferred embodiment of the invention is generally denoted by 1.

In the present example, the document 1 is a so-called "electronic" passport, i.e. of the type embedding a storage means capable of remotely transmitting data in a wireless mode, typically an RFID chip denoted by 6 and provided with an antenna 60.

The document 1 is made of a plurality of sheets, folded at respective longitudinal lines L and sewn (as a seam) thereamong at said lines so as to make the pages of the booklet. In the present example, the folding lines correspond to the center lines of the sheets. Thus, each sheet defines two booklet pages separated at the center line of the sheet itself (corresponding to the center line of the booklet) from the above-mentioned seam, the latter denoted by 2.

In particular, the passport 1 has a cover sheet generally denoted by 3. The latter is comprised of an external layer 31 made of fabric, preferably Bukram cloth, an intermediate layer—so-called "inlay"—600, containing the above-to mentioned chips 6 and associated antenna 60 and glued onto the external fabric layer 31, and an internal flyleaf layer 32 glued on the inlay 600. The process of gluing said three layers will be described below.

The passport 1 further has a data sheet 4, distinct from the cover sheet 3 and arranged internally to the latter in a position immediately contiguous thereto. The data sheet 4 defines a first data page and a second connecting page, respectively 401 and 402, of the passport 1.

At the first page 401, the data sheet 4 bears just identification (ID) data of a subject, typically ICAO standard ones. Such data may be printed by laser engraving, etc.

At the second page 402, the data sheet 4 is glued on the cover sheet 3, and in particular on the flyleaf sheet 32, by a gluing process that will be described hereinafter.

It will be appreciated that the second page 402 is a protruding region of the actual data page 401 that can be glued and sewn into the booklet, and that such second page 402 has an extension such as to cover all or substantially all the size of the cover page to which it is adhered.

In particular, the data sheet 4 comprises a first and a second layer of plastic material, preferably thin polycarbonate, respectively 41 and 42, between which a third layer 43 made of flexible material, preferably of polyester, is interposed.

The third flexible layer 43 extends, in the present example, only in a zone of the sheet 4 concerned by said seam 2.

Therefore, the data sheet 4 comprises, at the second connecting page 402, a further intermediate filling layer 44, arranged in a position adjacent to the third flexible layer 43 in order to compensate for its thickness.

Preferably, also this intermediate filling layer 44 is made of plastic material, preferably thin polycarbonate.

In general, both the two layers 41 and 42 and the filling layer 44 may be made also of other materials, e.g. those suitable for the manufacturing of so-called "plastic cards".

Moreover, in FIG. 1 further layers 45, 46, 47 and 48 of the data page 401 are depicted, preferably them also made of polycarbonate, of a number and thickness calibrated to and suitable for specific identification demands.

By now, it will be better appreciated that the presence of the third flexible layer 43, which typically is laminated with all the other plastic material layers and specifically with the first and the second layer 41 and 42 in order to make the sandwich structure of the present example, reduces the rigidity of the plastic material itself at the seam and allows to obtain a composite sheet that can be sewn.

Preferably, the first layer 41 contains one or more safety/anti-counterfeiting elements printed astride the seam 2. Likewise, the intermediate flexible layer 43 may contain a security hologram, always at the seam 2.

In particular, the data page 401 and/or the connecting page 402 may be enriched with one or more of the following security elements:
  UV litho printing with iris,
  UV fluorescent printing,
  silk-screen printing with OVI inks,
  intaglio printing,
  security hologram,
  personalization by laser engraving, and/or
  embossing with micro-writings.

The passport 1 further comprises a plurality of further internal sheets/pages, generally denoted by 5, bearing or apt to receive further data.

As mentioned above, the passport 1 further comprises an electronic data storage means equipped with an antenna for radio transmission, preferably an RFID chip element 6. In particular, as described above, chip 6 and antenna 60 are embedded in a so-called "inlay" layer 600, in turn embedded in the cover sheet 3.

In the arrangement shown, the storage means 6 is positioned at the cover sheet 3 lying oppositely to the center line of sewing with respect to the data page 401.

It will be appreciated that the option of comparing the data recorded on the data page 401 with those stored in the chip 6 guarantees the authenticity of the two main identification elements of the booklet.

Moreover, in a variant embodiment, inside the data page 401 it is possible to laminate a circuit acting on the transmission signal and allowing reading of the RFID chip 6 only when the booklet is open (i.e., at control and identification operations). Such a device, by cutting off the resonance frequency of the chip antenna, interrupts the communication of the chip 6 when the passport 1 is shut, preventing fraudulent access to sensible data contained therein.

As to the specific modes of manufacturing the data page 401 and the connecting page 402, a preferred process of manufacturing the data sheet 4 envisages the following stages:
  registration coupling, preferably by hot pressure gluing, of a strip of material of the flexible layer 43 on the second plastic layer 42—all other layers 41 and 44-48 should then be assembled and fixed in registration with respect to said strip;
  lamination of layers 41, 42 (already coupled to the flexible layer 43) and 44-48, performed with shaped plates and with thicknesses calibrated to compensate for the difference in thickness between data page 401 and connecting page 402—the lamination plates could also engrave other elements in register, such as micro-writings in relief or "in negative" or other graphic elements;
  punching for making passport-sized polycarbonate data sheets provided with connecting page 402—the final thickness of the data page 401 is preferably comprised in a range of about 0.5-0.8 mm, whereas the final thickness of the connecting page 402 is preferably comprised in a range of about 0.2-0.5 mm—such thicknesses guarantee a good mechanical resistance of the material without producing excessive rigidity of the booklet; and
  assembling into the booklet the data sheet 4, obtained by sewing and gluing of the connecting page 402 on the cover 3 with a cold pressure process, by using water-based polyurethane or vinyl glue—this same gluing process ensures connection between electronic inlay (6+60) and external layer 31 of the cover sheet 3.

Hereinafter, a preferred embodiment of the method of manufacturing an identification document in the form of a booklet according to the invention, and in particular of the passport 1 described hereto will be described; such method is based on a sequence of gluing stages.

The method is applied in two subsequent steps, each comprised of plural stages and respectively illustrated in FIGS. 2A-2D and 3A-3D.

Figure 2A:
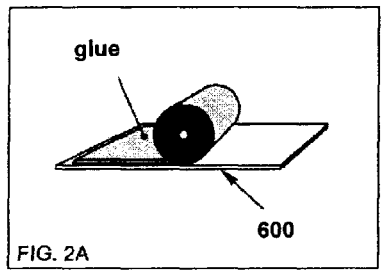
FIGS. 2A to 2D and 3A to 3D show each a perspective view referring to a respective stage of assembling of the identification document of FIGS. 1A and 1B.

According to a first step, in a first stage shown in FIG. 2A the above-mentioned inlay sheet 600 bearing the RFID chip 6 and the antenna 60 is blocked and adhesivised, preferably with polyurethane glue or vinyl glue.

Figure 2B:
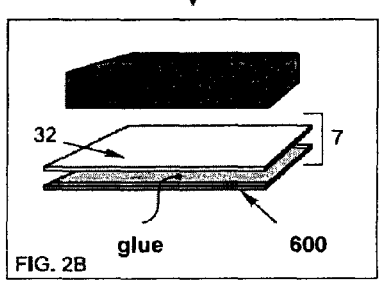

According to a second step shown in FIG. 2B, the inlay layer thus adhesivised is coupled in register with the flyleaf layer 32 and such coupling is pressed in order to block it, thereby producing a composite layer denoted by 7.

Figure 2C:
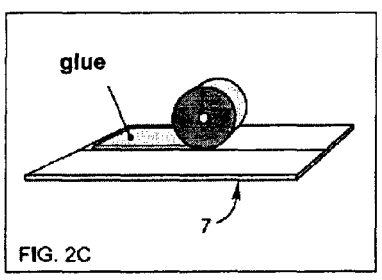

Subsequently, in a third step shown in FIG. 2C, the composite layer 7 is adhesivised for one-half of its surface, corresponding to the extension of a page of the passport 1.

Figure 2D:
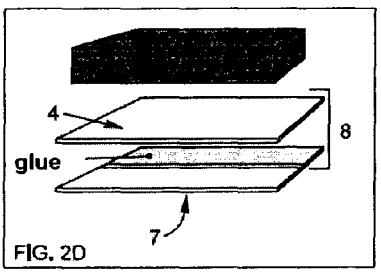

Then, in a fourth step shown in FIG. 2D, the composite layer 7 is coupled in register with the data sheet 4 and the whole is pressed in order to block the coupling between the connecting page 402 and the flyleaf layer 32, obtaining a further composite layer denoted by 8.

Figure 3A:
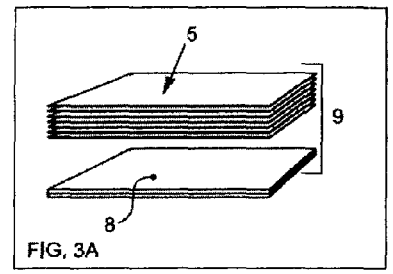

On the basis of the above-mentioned second step, in a fifth stage shown in FIG. 3A the composite layer 8 is assembled in register with the folded sheets 5 of the booklet, obtaining an assembly denoted by 9.

Figure 3B:
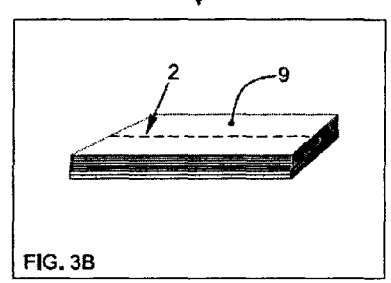

In a sixth stage, shown in FIG. 3B, the assembly 9 is inserted in a machine, known per se, which makes the seam 2, so as to obtain an assembled structure, it also denoted by 9.

Figure 3C:
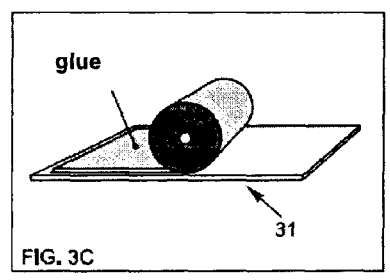

Then, in a seventh stage shown in FIG. 3C, the external layer 31 of the cover sheet 3 is adhesivised.

Figure 3D:
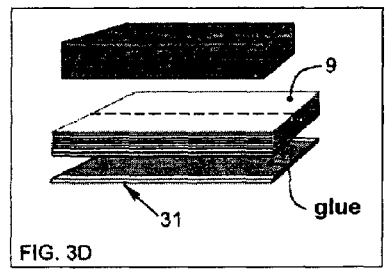

Finally, in an eighth stage shown in FIG. 3D the cover layer 31 is coupled in register with the assembled structure 9 provided with seam 2 and the whole is pressed in order to block the coupling.

The present invention has been hereto described with reference to exemplary and non-exhaustive preferred embodiments thereof. It is understood that other embodiments might exist, all falling within the concept of the same invention, and all comprised within the protective scope of the claims hereinafter.

The invention claimed is:

1. A method of manufacturing an identification document in form of a booklet, the identification document bearing a plurality of sheets folded or foldable substantially at respective longitudinal lines so as to make pages of the booklet, the identification document comprising:
    a cover sheet;
    an electronic data storage means embedded in said cover sheet; and
    a data sheet distinct from said cover sheet and made by a first and a second layer of plastic material,
    wherein the data sheet is arranged internally to said cover sheet and defines a data page bearing identification data of a subject and a connecting page bound with said cover sheet,
    the method of manufacturing comprising:
    (a) gluing one fly leaf layer of said cover sheet with an inlay intermediate layer bearing the electronic data storage means and with said connecting page of said data sheet, for the obtaining of a composite layer;
    (b) connecting said composite layer with further sheets of the booklet, for obtaining an assembled structure; and
    (c) gluing said assembled structure, at said one flyleaf layer, with an external layer of said cover sheet,
    wherein said booklet comprises said data sheet having said intermediate layer of flexible material interposed between said first and second layer of plastic material and extending between said first and second layer of plasticmaterial at least at the longitudinal folding line, and
    wherein said cover sheet and data sheet are connected therebetween at the respective longitudinal folding lines.

2. The method of claim 1, wherein said electronic data storage means is arranged at a side opposite to the longitudinal folding line with respect to said data page.

3. The method of claim 1, wherein said data sheet is arranged in a position immediately contiguous to said cover sheet.

4. The method of claim 1, wherein said flexible material is or comprises polyester.

5. The method of claim 1, wherein said plastic material is or comprises polycarbonate.

6. The method of claim 1, wherein said connecting page is glued onto said cover sheet.

7. The method of claim 1, wherein said data sheet comprises, at least at said connecting page, a further intermediate filling layer, arranged in a position adjacent to said intermediate layer of flexible material in order to compensate for a thickness thereof and preferably made of polycarbonate.

8. The method of claim 1, further comprising introducing in the data sheet one or more anti-counterfeiting security elements.

9. The method of claim 8, wherein introducing said one or more anti-counterfeiting security elements is at the longitudinal folding line.

10. The method of claim 9, further comprising introducing one or more anti-counterfeiting security elements at said intermediate layer of flexible material.

11. The method of claim 8, wherein introducing said one or more anti-counterfeiting security elements comprises introducing one or more holograms.

12. The method of claim 1, wherein said data page has a thickness comprised in a range of about 0.5 mm-0.8 mm.

13. The method of claim 1, wherein said connecting page has a thickness comprised in a range of about 0.2 mm-0.5 mm.

14. The method of claim 1, wherein said electronic data storage means is an RFID element.

15. The method of claim 1, wherein said cover sheet comprises at least one external layer made of fabric.

16. The method of claim 15, wherein the at least one external layer made of fabric is Buckram cloth and further comprises an internal flyleaf layer.

17. The method of claim 1, further comprising sewing said cover sheet and data sheet thereamong at the respective longitudinal folding lines thereof.

18. The method of claim 1, wherein the identification document is a passport.

* * * * *